United States Patent
Minami et al.

(10) Patent No.: US 6,849,350 B2
(45) Date of Patent: Feb. 1, 2005

(54) ARTICLE HAVING A PREDETERMINED SURFACE SHAPE AND METHOD FOR PREPARATION THEREOF

(75) Inventors: Tsutomu Minami, 7-1, Oonodai 2-chome, Osakasayama-shi, Osaka 589-0023 (JP); Masahiro Tatsumisago, Sakai (JP); Kiyoharu Tadanaga, Sakai (JP); Atsunori Matsuda, Kawachinagano (JP); Masahiro Hori, Osaka (JP); Hiroaki Yamamoto, Osaka (JP); Koichiro Nakamura, Osaka (JP)

(73) Assignees: Nippon Sheet Glass Co., Ltd., Osaka (JP); Tsutomu Minami, Osaka (JP)

( * ) Notice: Subject to any disclaimer, the term of this patent is extended or adjusted under 35 U.S.C. 154(b) by 0 days.

(21) Appl. No.: 10/258,809

(22) PCT Filed: Feb. 22, 2002

(86) PCT No.: PCT/JP02/01624

§ 371 (c)(1),
(2), (4) Date: Oct. 28, 2002

(87) PCT Pub. No.: WO02/068183

PCT Pub. Date: Sep. 6, 2002

(65) Prior Publication Data

US 2003/0146415 A1 Aug. 7, 2003

(30) Foreign Application Priority Data

Feb. 28, 2001 (JP) ........................................ 2001-055431

(51) Int. Cl.$^7$ ................................................ B32B 9/00
(52) U.S. Cl. ..................................... 428/701; 428/699
(58) Field of Search .................................. 428/699, 701

(56) References Cited

U.S. PATENT DOCUMENTS

4,810,547 A    3/1989    Minami et al.

FOREIGN PATENT DOCUMENTS

| EP | 0985510 | 3/2000 |
| EP | 1174258 | 1/2002 |
| JP | 62-102445 | 5/1987 |
| JP | 62-225273 | 10/1987 |
| JP | 6-114334 | 4/1994 |
| JP | 6-242303 | 9/1994 |
| JP | 11-314927 | 11/1999 |

*Primary Examiner*—Terrel Morris
*Assistant Examiner*—Arden B Sperty
(74) *Attorney, Agent, or Firm*—Wenderoth, Lind & Ponack, L.L.P.

(57) ABSTRACT

An article having a predetermined surface configuration comprising a substrate and a gelled film having a high refractive index, excellent heat resistance, high film hardness and excellent transferability formed on the surface of the substrate.

A process for producing an article having a gelled film with a transferred surface on the surface of a substrate by arranging a sol-gel material with close contact between the substrate and a mold in the form of a film and heating it. The sol-gel material contains a metal compound represented by $M^1X_m$, a hydrolyzate thereof or a hydrolysis/polycondensation product thereof, and a metal compound represented by $R^1M^2Y_n$, a hydrolyzate thereof or a hydrolysis/polycondensation product thereof, wherein at least one of $M^1$ and $M^2$ is a metal atom selected from Ti, Zr, Al, Ge, Sn or Sb and the metal atom accounts for at least 10 atom % of the total of $M^1$ and $M^2$.

3 Claims, No Drawings

ARTICLE HAVING A PREDETERMINED SURFACE SHAPE AND METHOD FOR PREPARATION THEREOF

FIELD OF THE INVENTION

The present invention relates to an article having a predetermined surface configuration covered with an inorganic-organic composite film and, particularly, to a micro-optical element such as a microlens array or optical waveguide and to a production process therefor.

DESCRIPTION OF THE PRIOR ART

JP-A 62-225273 (the term "JP-A" as used herein means an "unexamined published Japanese patent application") reports a substrate having fine irregularities produced by applying a solution containing tetraethoxysilane and polyethylene glycol to a glass substrate using a sol-gel method and pressing a mold against the substrate to transfer an uneven pattern. JP-A 6-114334 also reports a substrate having fine irregularities produced by applying a solution containing organoalkoxysilanes containing methyltriethoxysilane and tetraethoxysilane to a glass substrate and pressing a mold against the substrate to transfer an uneven pattern. Further, JP-A 11-314927 discloses a substrate having fine irregularities manufactured by pressing a mold against a composite material comprising a hydrolysis/polycondensation product of dimethylalkoxysilane and phenyltrialkoxysilane to transfer an uneven pattern.

Although the substrate having fine irregularities produced by using a solution containing tetraethoxysilane and polyethylene glycol has a characteristic feature that the coating film becomes inorganic and amorphous completely when it is baked at 350° C., it has the following problems. That is, the film is shrunken by baking, a configuration which is the inversion of the molding surface of the mold cannot be transferred completely, and when the thickness of the film is 1 µm or more, the film is cracked by shrinkage stress. Although the substrate having fine irregularities produced by using a solution containing organoalkoxysilanes containing methyltriethoxysilane and tetraethoxysilane has excellent features that the molding surface of a mold can be transferred completely due to its low shrinkage factor and that a thick film can be formed, it is difficult to control the refractive index of the film. Further, although the substrate having fine irregularities manufactured by pressing a mold against the composite material comprising the hydrolysis/polycondensation product of dimethylalkoxysilane and phenyltrialkoxysilane to transfer an uneven pattern has excellent heat resistance and makes possible the easy molding of a thick film pattern, it involves problems such as a low refractive index and low film hardness.

SUMMARY OF THE INVENTION

It is an object of the present invention to provide a process for producing an article, for example, a planar microlens array, having a predetermined surface configuration and comprising a substrate covered with a gelled film having a high refractive index which could not be obtained in the prior art, excellent heat resistance, high film hardness and excellent transferability.

It is another object of the present invention to provide an article having a predetermined surface configuration and the above excellent properties.

Other objects and advantages of the present invention will become apparent from the following description.

According to the present invention, firstly, the above objects and advantages of the present invention are attained by a process for producing an article having a predetermined surface configuration, which comprises arranging a sol-gel material with close contact between a substrate and a mold in the form of a film and heating it to form a gelled film having a surface configuration which is the inversion of the molding surface configuration of the mold on the surface of the substrate, wherein the sol-gel material contains (A) at least one compound selected from the group consisting of a metal compound represented by the following formula (1), a hydrolyzate thereof and a hydrolysis/polycondensation product thereof:

$$M^1 X_m \qquad (1)$$

wherein $M^1$ is silicon (Si), titanium (Ti), zirconium (Zr), germanium (Ge), aluminum (Al), tin (Sn) or antimony (Sb), X is an alkoxyl group or halogen atom, and m is 4 when $M^1$ is Si, Ti, Zr, Ge or Sn and m is 3 when $M^1$ is Al or Sb, and (B) at least one compound selected from the group consisting of a metal compound represented by the following formula (2), a hydrolyzate thereof and a hydrolysis/polycondensation product thereof:

$$R^1 M^2 Y_n \qquad (2)$$

wherein $R^1$ is an aryl group, substituted aryl group or benzyl group, $M^2$ is Si, Ti, Zr, Al, Ge, Sn or Sb, Y is an alkoxyl group or halogen atom, and n is 3 when $M^2$ is Si, Ti, Zr, Ge or Sn and m is 2 when $M^2$ is Al or Sb; and wherein at least one of $M^1$ and $M^2$ is at least one specific metal atom selected from the group consisting of Ti, Zr, Al, Ge, Sn and Sb, and the specific metal atom contained in the sol-gel material accounts for at least 10 atom % of the total of $M^1$ and $M^2$ in the sol-gel material.

According to the present invention, secondly, the above objects and advantages of the present invention are attained by an article having a predetermined surface configuration and comprising a substrate and an organic-inorganic composite film formed on the surface of the substrate, wherein the organic-inorganic composite film contains a metal oxide represented by the following formula (3):

$$M^3 O_p \qquad (3)$$

wherein $M^3$ is Si, Ti, Zr, Ge, Al, Sn or Sb, and p is 2 when $M^3$ is Si, Ti, Zr, Ge or Sn and p is 3/2 when $M^3$ is Al or Sb, and a metal compound represented by the following formula (4):

$$R^2 M^4 O_q \qquad (4)$$

wherein $R^2$ is an aryl group, substituted aryl group or benzyl group, $M^4$ is Si, Ti, Zr, Ge, Al, Sn or Sb, and q is 3/2 when $M^4$ is Si, Ti, Zr, Ge or Sn and q is 2 when $M^4$ is Al or Sb; and wherein at least one of $M^3$ in the formula (3) and $M^4$ in the formula (4) is at least one specific metal atom selected from the group consisting of Ti, Zr, Ge, Al, Sn and Sb, and the specific metal atom accounts for at least 10 atom % of the total of $M^3$ and $M^4$.

THE PREFERRED EMBODIMENT OF THE INVENTION

In the present invention, the sol-gel material contains at least one compound (to be referred to as "component (A)"

hereinafter) selected from the group consisting of a metal compound represented by the above formula (1), a hydrolyzate thereof and a hydrolysis/polycondensation product thereof and at least one compound (to be referred to as "component (B)" hereinafter) selected from the group consisting of a metal compound represented by the above formula (2), a hydrolyzate thereof and a hydrolysis/polycondensation product thereof, wherein at least one of $M^1$ in the formula (1) and $M^2$ in the formula (2) is at least one specific metal atom selected from the group consisting of Ti, Zr, Al, Ge, Sn and Sb and the specific metal atom contained in the sol-gel material accounts for at least 10 atom %, preferably at least 20 atom % of the total of all the metal atoms contained in the above sol-gel material. Thereby, a film having high hardness and excellent transferability is obtained. When the content of the above specific metal atom is lower than 10 atom % of the total of all the metal atoms contained in the above sol-gel material, the hardness of the film lowers and the transferability of the film deteriorates.

In the above formula (1), $M^1$ is a metal atom, and X is an alkoxyl group or halogen atom. The metal atom $M^1$ is Si, Ti, Zr, Ge, Al, Sn or Sb, preferably Ti, Zr, Ge, Al, Sn or Sb. The halogen atom X is fluorine, chlorine or bromine. X is particularly preferably an alkoxyl group having 1 to 3 carbon atoms.

Example of the component (A) include tetraethoxysilane, tetramethoxysilane, tetrabromosilane, tetra-n-buthoxysilane, titanium ethoxide, titanium methoxide, titanium n-propoxide, titanium n-nonyloxide, titanium isostearyl isopropoxide, zirconium ethoxide, zirconium methoxide, zirconium isopropoxide, zirconium 2-methyl-2-butoxide, aluminum (III) s-butoxide, aluminum (III) t-butoxide, aluminum (III) ethoxide, aluminum (III) s-isopropoxide, tetraethoxygermane, tetramethoxygermane, tetraisopropoxygermane, tetrabuthoxygermane, tetraethoxytin, tetramethoxytin, tetraisopropoxytin, tetrabuthoxytin, antimony (III) n-butoxide, antimony (III) methoxide, antimony (III) ethoxide and antimony (III) s-isopropoxide. Out of these, tetrabuthoxy titanium, tetrabuthoxy zirconium, tributhoxy aluminum (III), tetrabuthoxy germanium tetrabuthoxytin and tetrabuthoxy antimony are preferred. Besides these, hydrolyzates thereof and condensates thereof, preferably condensates thereof having a condensation degree of 2 to 10 may also be used. When the above condensates are used, the content of a monomer is used as the content of the component (A).

In the metal compound (component (B)) represented by the above formula (2), the aryl group represented by $R^1$ is an aryl group having 6 to 13 carbon atoms, preferably phenyl, biphenyl or naphthyl. The substituent of the aryl group is preferably an alkyl group having 1 to 3 carbon atoms or halogen atom. The aryl group substituted by the above substituent is preferably a tolyl group, xylyl group or chlorophenyl group. Examples of the alkoxyl group and halogen atom represented by Y are the same as those listed for X in the formula (1).

The component (B) is phenyltrimethoxysilane, phenyltriethoxysilane, phenyltri-n-buthoxysilane, phenyltrichlorosilane, benzyltrimethoxysilane or benzyltriethoxysilane when $R^1$ is an aryl group or substituted aryl group. When $R^1$ is a benzyl group, it is an organotrialkxoysilane such as benzyltri-n-buthoxysilane or benzyltrichlorosilane. Besides, hydrolyzates thereof and condensates thereof, preferably condensates having a condensation degree of 2 to 10 may also be used. When the above condensates are used, the content of a monomer is used as the content of the component (B). Phenyltriethoxysilane and substituted phenyltriethoxysilane are preferably used as the component (B).

Preferably, the sol-gel material contains the component (A) in an amount of 5 to 50 mol % and the component (B) in an amount of 50 to 95 mol % based on the total of the components (A) and (B). More preferably, the sol-gel material contains the component (A) in an amount of 20 to 50 mol % and the component (B) in an amount of 50 to 80 mol %. Since flexibility is provided to the obtained film by mixing these components in the above ratio, a film having a thickness of 10 μm or more hardly cracks at the time of final heating at 200° C. or cooling after final heating and has high hardness.

Besides the components (A) and (B), water and a catalyst required for hydrolysis and a solvent for controlling viscosity are preferably added as required as raw materials for the sol-gel material in the present invention. The above water and catalyst are not always necessary when a hydrolyzate or hydrolysis/polycondensation product is used as the components (A) and (B). When the component (A) or (B) contains Ti, Zr, Ge, Al, Sn or Sb, a chelating agent may be added for stabilization.

An acid catalyst is preferably used as the catalyst. At least one acid catalyst selected from the group consisting of formic acid, acetic acid, tetrafluoroacetic acid, propionic acid, oxalic acid, hydrochloric acid, nitric acid and sulfuric acid is preferably used in the form of an aqueous solution. The amount of the acid catalyst differs according to the type of an acid and the strength of protonic acid (weak acid or strong acid). When the amount of the acid catalyst is too small, a hydrolysis/dehydration condensation reaction proceeds slow and when the amount is too large, a condensation reaction proceeds too far with the result that the molecular weight becomes too high and a precipitate or gelled coating solution is readily produced disadvantageously. Out of the above acid catalysts, organic acids which are a weak acid are preferred. Out of the organic acids, formic acid is particularly preferred because it has a low molecular weight and readily evaporates. As for the amount of the acid catalyst, when formic acid is used as the acid catalyst, it is used in an amount of 0.5 to 5 mmols, more preferably 0.7 to 2 mmols based on 1 mol of the total of the components (A) and (B).

Water is preferably added more than its stoichiometric amount required for hydrolysis. When the amount of water is smaller than the stoichiometric amount, unreacted silane compounds (A) and (B) readily volatilize at the time of a heat treatment for gelation. In general, the amount of water including water contained in the aqueous solution of the catalyst is 1.1 to 30 times the required stoichiometric amount, or preferably 2 to 20 times, more preferably 2 to 5 times the total molar amount of the components (A) and (B). When the article having a predetermined surface configuration of the present invention, for example, an optical element is used in the vicinity of a memory or other electronic circuit, if chlorine is contained in the optical element, it may shorten the service life of the electronic circuit. Therefore, it is preferred that the acid catalyst should not contain chlorine.

Examples of the diluting solvent include alcohols such as methanol, ethanol, butanol, ethylene glycol and ethylene glycol-mono-n-propyl ether; aliphatic and alicyclic hydrocarbons such as n-hexane, n-octane, cyclohexane, cyclopentane and cyclooctane; aromatic hydrocarbons such as toluene, xylene and ethylbenzene; esters such as ethyl formate, ethyl acetate, n-butyl acetate, ethylene glycol monomethyl ether acetate, ethylene glycol monoethyl ether acetate and ethylene glycol monobutyl ether acetate; ketones such as acetone, methyl ethyl ketone, methyl isobutyl ketone and cyclohexanone; ethers such as dimethoxyethane, tetrahydrofuran, dioxane and diisopropyl ether; chlorinated hydrocarbons such as chloroform, methylene chloride, carbon tetrachloride and tetrachloroethane; and aprotic polar solvents such as N-methylpyrrolidone, dimethyl formamide, dimethylacetamide and ethylene carbonate.

The chelating agent may be a β-ketoester compound such as methyl acetoacetate, ethyl acetoacetate, propyl acetoacetate or butyl acetoacetate.

A preferred example of the composition of the sol-gel material in the present invention is as follows.
(A) a compound(s) represented by the above formula (1): 1 molar part
(B) a compound(s) represented by the following formula (2): 1.0 to 19 molar parts
(C) an alcohol: 0.3 to 3 times the total number of molar parts of the components (A) and (B)
(D) an acid catalyst: 0.00001 to 0.1 time the total number of molar parts of the component (A) and (B)
(E) water: 2 to 20 times the total number of molar parts of the components (A) and (B)

At least one of $M^1$ in the formula (1) and $M^2$ in the formula (2) is at least one specific metal atom selected from the group consisting of Ti, Zr, Ge, Al, Sn and Sb, and the above specific metal atom accounts for at least 10 atom % of the total of $M^1$ and $M^2$.

In the present invention, a solution comprising the components (A) and (B), an alcohol solvent, water and a catalyst which are the raw materials of the sol-gel material is maintained at room temperature for 10 to 120 minutes under agitation to hydrolyze the components in order to prepare the sol-gel material.

To apply the above solution, a known coating technique such as casting, dipping, spin coating, spraying, printing, flow coating or a combination thereof may be suitably used. The thickness of the formed film can be controlled by changing the pull-up speed in the dipping technique or the revolution speed of the substrate in the spin coating technique and the concentration of the coating solution.

There are the following two typical processes for molding an article, for example, an optical element, covered with a gelled film having a surface configuration which is the inversion of the molding surface configuration of a mold by arranging the above sol-gel material with close contact between the substrate and the mold in the form of a film and heating it.

In the first process (to be referred to as "mold pouring process" hereinafter), the liquid sol-gel material is poured over a mold and heated, and the substrate of an article is brought into contact with the heated sol-gel material, further heated to be assembled with the molded film and finally heated after the mold is removed. That is, the mold having fine irregularities in the molding surface is kept horizontal, and the liquid sol-gel material having a viscosity of $10^3$ poise or less is poured over the molding surface of the mold to fill depressions in the mold. Alternatively, the mold may be immersed in a bath of the sol-gel material, or the liquid sol-gel material may be applied to the molding surface of the mold with a brush. In this state, the liquid sol-gel material is maintained at room temperature to 180° C. for 20 to 120 minutes until the viscosity of the sol-gel material filled in the molding surface of the mold becomes $10^4$ to $10^8$ poise to carry out a dehydration/polycondensation reaction.

Then, the substrate is brought into close contact with the sol-gel material on the mold in such a manner that a gap should not be formed between the sol-gel material and the surface of the substrate and further maintained at room temperature to 180° C. for 10 to 120 minutes to almost complete the dehydration/polycondensation reaction of the sol-gel material so as to gel the material. Subsequently, by stripping off and removing the mold, a film of a poly metal-oxygen compound such as polysiloxane as a soft gelled film having irregularities in the surface which are the inversion of irregularities in the molding surface of the mold is formed in such a state that it is adhered to the surface of the substrate. When the mold is removed too early, the poly metal-oxygen compound film is too soft and its uneven surface is deformed by its own weight. Therefore, the above heating is carried out until this deformation does not occur.

This film is finally heated at 50 to 350° C. for 10 to 150 minutes to polycondense the residual metal hydroxyl group (for example, the residual silanol group) of the poly metal-oxygen compound film (for example, a polysiloxane film) and vaporize water generated by polycondensation with the result that the film is slightly shrunken in volume in a thickness direction to become a tight film. Thus, an article such as an optical element covered with a film having a surface configuration which is the inversion of the molding surface configuration of the mold is obtained.

In the second molding process (to be referred to as "substrate pouring process" hereinafter), the liquid sol-gel material is directly poured over the surface of a substrate and heated, the mold is pressed against the film on the surface of the substrate when the liquid film becomes plastic (the viscosity of the liquid becomes $10^4$ to $10^8$ poise) and heated in this state to carry out transfer molding, the mold is removed, and the film is finally heated. That is, the surface to be covered of the substrate is held horizontal, the liquid sol-gel material having a viscosity of $10^3$ poise or less is poured over the substrate and spread over the substrate to a predetermined thickness in the form of a film. In this state, the poured sol-gel material is maintained at room temperature to 180° C. for 5 to 120 minutes under normal pressure or reduced pressure to carry out a dehydration/polycondensation reaction until the viscosity of the sol-gel material becomes $10^4$ to $10^8$ poise. Subsequently, the mold having fine irregularities is pressed against the sol-gel film on the surface of the substrate and maintained at a pressure of 0.5 to 120 kg/cm² and a temperature of normal temperature to 350° C. for 60 seconds to 60 minutes to almost complete the dehydration/polycondensation reaction of the sol-gel material so as to gel it. By stripping off the mold, a film of a poly metal-oxygen compound which is a gelled film having irregularities in the surface which are the inversion of irregularities of the mold is formed in such a state that it is adhered to the surface of the substrate. The film is finally heated at 50 to 350° C. for 10 to 150 minutes as required to polycondense the residual silanol group of the poly metal-oxygen compound film and vaporize water generated by polycondensation with the result that the film is slightly shrunken in volume in a thickness direction to become a tight film. Thus, an optical element such as a microlens, diffraction grating, optical waveguide or prism, or other article covered with a film having a surface configuration which is the inversion of the molding surface configuration of the mold is obtained.

As for the above mold, the flat surface of a glass substrate is etched precisely to form a mold having a target shape, for example, a concave shape. A convex metal mother die can be produced by electroless plating or electrolytic plating using this as a master mold. A convex metal master mold can be produced by the above plating using the above concave mold as a mother die and further a concave metal mother die can be produced by the above plating using this master mold. These convex and concave mother dies can be used as molds. In the above plating, a metal such as nickel or chromium is preferably used. A resin mother die fabricated from an ultraviolet curable resin by 2P molding using the master mold produced by the above method may be used as a mold.

The article having a predetermined surface configuration of the present invention, that is, a substrate having fine irregularities can be obtained by forming any fine irregularities on any substrate. When this is used as a planar microlens array, glass is preferably selected as a substrate material. Examples of the glass include quartz glass, soda lime glass, alkali aminosilicate glass, alkali borosilicate glass, poly-component non-alkali glass and low expansion crystallized glass. To converge light efficiently, a substrate having fine irregularities which are an array of spherical or aspherical lenses is preferred.

The organic poly metal-oxygen compound such as organopolysiloxane constituting this film contains a metal oxide represented by the above formula (3) in an amount of 5 to 50 mol %, preferably 20 to 40 mol %, and a metal compound represented by the above formula (4), particularly arylsiloxane, substituted arylsiloxane or benzylsiloxane, in an amount of preferably 50 to 95 mol %, more preferably 60 to 80 mol %. Preferably, the organic poly metal-oxygen compound constituting this film contains the metal oxide in an amount of preferably 10 to 50 wt %, more preferably 15 to 40 wt % and the arylsiloxane (or substituted arylsiloxane) or benzylsiloxane in an amount of preferably 39 to 58 wt %, more preferably 44 to 53 wt %. The thickness (film thickness) from the top of a projection portion to the substrate of the film of this organic poly metal-oxygen compound can be set to any value in limits that do not generate a crack, for example, 0.5 to 10 $\mu$m.

The film having fine irregularities which is an organic-inorganic composite film containing both the above components (A) and (B) of the present invention enables the complete transfer of the mold and the patterning of a thick film to a depth of several tens of micrometers because shrinkage caused by baking and the generated film stress are small. Further, by controlling the ratio of the above component (A) to the component (B), the cracking of the film can be prevented and the hardness of the film can be improved. When the heat treatment temperature of the film is increased, the film becomes tight and very hard but it is easily cracked. When the film is heated at 100° C. for 30 minutes and has a thickness of 10 $\mu$m or less, and the content of a metal oxide (such as $TiO_2$) is 10 to 50 mol % (the content of an aryl metal oxygen compound, substituted aryl metal oxygen compound or benzyl metal oxygen compound is 50 to 90 mol %), the film does not crack. When the film is heated at 200° C. for 30 minutes and has a thickness of 1 to 5 $\mu$m, and the content of a metal oxide is 20 to 50 mol % (the content of an aryl metal oxygen compound (or a substituted aryl metal oxygen compound) or benzyl metal oxygen compound is 50 to 80 mol %), the film does not crack. When the film is heated at 300° C. for 30 minutes and has a thickness of 4 $\mu$m or less, and the content of a metal oxide is 20 to 40 mol % (the content of an aryl metal oxygen compound or substituted aryl metal oxygen compound or benzyl metal oxygen compound is 6 to 80 mol %), the film does not crack. This heat treatment or drying treatment before the heat treatment is preferably carried out at a relative humidity of preferably 40% or less, more preferably 25% or less to prevent the film from becoming opaque. It is considered that an opaque film is formed when the solvent and water remain in the film as air bubbles at the time of vaporization. Out of the metal oxides in the above formulas (3) and (4), Ti, Zr, Al and Ge have a higher refractive index than Si and the refractive index of the film can be controlled to a desired large value, for example, 1.50 to 1.70, by adjusting the content of each of the above metal elements.

EXAMPLES

Coating Solution 1:

19.23 g of phenyltriethoxysilane and 2.41 g of ethanol were weighed, mixed together and stirred for 5 minutes, and 7.21 g of 1.44 wt % dilute hydrochloric acid was added to this solution and stirred in the atmosphere at room temperature for about 30 minutes to prepare a homogenous solution. Further, a mixture of 6.81 g of titanium butoxide, 3.90 g of ethyl acetyl acetone and 2.41 g of ethanol was added to the above solution and stirred for 30 minutes. The molar ratio of phenyltriethoxysilane to titanium butoxide (that is, number of silicon atoms/number of titanium atoms) in this solution was 80/20. This solution was further stirred in the atmosphere at room temperature for 1 hour and heated in an oven at 80° C. for 12 hours to carry out a cohydrolytic reaction and polycondensation reaction between phenyltriethoxysilane and titanium butoxide. The obtained solution containing a cohydrolysis/polycondensation product was designated as coating solution 1.

Coating Solution 2:

19.23 g of phenyltriethoxysilane and 2.41 g of ethanol were weighed, mixed together and stirred for 5 minutes, and 7.21 g of 1.44 wt % dilute hydrochloric acid was added to this solution and stirred in the atmosphere at room temperature for about 30 minutes to prepare a homogeneous solution. Further, a mixture of 7.67 g of zirconium n-butoxide, 3.90 g of ethyl acetyl acetone and 2.41 g of ethanol was added to the above solution and stirred for 30 minutes. The molar ratio of phenyltriethoxysilane to zirconium butoxide in the solution was 80/20. The solution was further stirred in the atmosphere at room temperature for 1 hour and heated in an oven at 80° C. for 12 hours to carry out a cohydrolytic reaction and polycondensation reaction between phenyltriethoxysilane and zirconium butoxide. The obtained solution containing a cohydrolysis/polycondensation product was designated as coating solution 2.

Coating Solution 3:

21.77 g of benzyltrichlorogermane and 2.41 g of ethanol were weighed, mixed together and stirred for 5 minutes, and 7.21 g of 1.44 wt % dilute hydrochloric acid was added to this solution and stirred in the atmosphere at room temperature for about 30 minutes to prepare a homogeneous solution. Further, a mixture of 4.29 g of germanium tetrachloride and 2.41 g of ethanol was added to the above solution and stirred for 30 minutes. The molar ratio of benzyltrichlorogermane to germanium tetrachloride in the solution was 80/20. The solution was further stirred in the atmosphere at room temperature for 1 hour and heated in an oven at 80° C. for 12 hours to carry out a cohydrolytic reaction and polycondensation reaction between benzyltrichlorogermane and germanium tetrachloride. The obtained solution containing a cohydrolysis-polycondenzation product was designated as coating solution 3.

Coating Solution 4:

24.17 g of phenyltrichlorotin and 2.41 g of ethanol were weighed, mixed together and stirred for 5 minutes, and 7.21 g of 1.44 wt % dilute hydrochloric acid was added to this solution and stirred in the atmosphere at room temperature for about 30 minutes to prepare a homogeneous solution. Further, a mixture of 4.17 g of tetraethoxysilane and 2.41 g of ethanol was added to the above solution and stirred for 30 minutes. The molar ratio of phenyltrichlorotin to tetraethoxysilane in the above solution was 80/20. The solution was further stirred in the atmosphere at room temperature for 1 hour and heated in an oven at 80° C. for 12 hours to carry out a cohydrolytic reaction and polycondensation reaction between phenyltrichlorotin and tetraethoxysilane. The obtained solution containing a cohydrolysis/polycondensation product was designated as coating solution 4.

Example 1

The coating solution 1 was applied to a 10 cm square soda lime silicate glass substrate (linear expansion coefficient: $1.0 \times 10^{-5}/°C$.) to a thickness of 1.1 mm by dip coating. This coated substrate was held in a vacuum press under reduced pressure for about 1 hour to vaporize the solvent. A quartz glass mold having a release film and a thickness of 1 mm and a large number of semispherical depressions having a depth of 3.5 $\mu$m and a curvature radius of 128 $\mu$m and disposed in a matrix form at a pitch of 80 $\mu$m in the surface was joined to the coating film on the glass substrate under a reduced pressure of $10^{-2}$ Torr and applied with a pressure of 30 kg/cm². After the film was heated at 80° C. and a relative humidity of 15% for 10 hours, the quartz glass mold was removed.

The coating film made from the cohydrolysis/polycondensation product of phenyltriethoxysilane and titanium butoxide on the glass substrate was cured by the further proceeding of the above cohydrolysis and polycondensation reactions after the mold was removed to form a transparent amorphous film made from phenyl group-containing silicon oxide-titanium oxide on the glass substrate. The thickness of the most thin area of the film was about 1 $\mu$m, the largest thickness from the top of the semisphere of the film was 4.5 $\mu$m, and a fine lens pattern was formed on the surface. The deterioration of a transferred pattern and the cracking and separation of the film caused by the shrinkage of the film were not observed. The focusing distance of each lens composed of the obtained transparent amorphous film was 2.01 mm. When the optical properties of the film were evaluated with a spectrophotometer, the film was completely transparent at a visible range and had a refractive index of about 1.64. When the spherical aberration of the lens was measured with a Zygo interferometer, it was 0.045 at an incident angle of 0° and 0.050 at an incident angle of 5°. Thus, coma aberration was small. When the transparent amorphous thick film was measured with the microhardness meter of Shimadzu Corporation, the microhardness of the film was 23. Even when the nail of a finger was strongly pressed against the surface of the film, no depression was produced at all. After a heat resistance test was made by maintaining the film at 300° C. for 2 hours, the temperature was returned to room temperature to observe the existence of cracking in order to evaluate heat resistance. As a result, the film did not crack or peel off, and the focusing distance of each lens remained unchanged from that before the heat resistance test. The results are shown in Table 1 and Table 2.

Comparative Example 1

7.13 g of methyltriethoxysilane, 2.08 g of tetraethoxysilane and 9.21 g of ethanol were weighed and stirred in the atmosphere at room temperature to prepare a homogeneous solution. The molar ratio of methyltriethoxysilane to tetraethoxysilane was 80/20. 3.60 g of 0.1 wt % formic acid was added slowly to the above solution and stirred in the atmosphere at room temperature for another 2 hours to carry out cohydrolysis between methyltriethoxysilane and tetraethoxysilane. This solution was further heated in an oven at 80° C. for 12 hours and the obtained solution containing a cohydrolysis/polycondensation product of methyltriethoxysilane and tetraethoxysilane was used as a coating solution.

This coating solution was applied to a quartz glass mold having a release film and a thickness of 1 mm and a large number of semispherical depressions having a depth of 11.7 $\mu$m and a curvature radius of 113 $\mu$m and disposed in a matrix form at a pitch of 80 $\mu$m in the surface to form a coating film under the same conditions as in Example 1 which was then cured and pressed. This inorganic-organic composite thick film made from the cohydrolysis/polycondensation product of methyltriethoxysilane and tetraethoxysilane became a transparent amorphous film made from methyl-group containing silicon oxide by curing.

Comparative Example 2

11.1 g of dimethyldiethoxysilane, 12.2 g of phenyltriethoxysilane and 5.8 g of ethanol were weighed and stirred in the atmosphere at room temperature to prepare a homogeneous solution. The molar ratio of phenyltriethoxysilane to dimethyldiethoxysilane was 40/60. 15.8 g of 0.1 wt % formic acid was added slowly to the above solution and stirred in the atmosphere at room temperature for another 2 hours to carry out cohydrolysis between dimethyldiethoxysilane and phenyltriethoxysilane. This solution was further heated in an oven at 80° C. for 12 hours and the obtained solution containing a cohydrolysis/polycondensation product of dimethyldiethoxysilane and phenyltriethoxysilane was used as a coating solution.

This coating solution was applied to a quartz glass mold having a release film and a thickness of 1 mm and a large number of semispherical depressions having a depth of 4.2 $\mu$m and a curvature radius of 104 $\mu$m and disposed in a matrix form at a pitch of 80 $\mu$m in the surface to form a coating film under the same conditions as in Example 1 which was then cured and pressed. This inorganic-organic composite thick film made from the cohydrolysis/polycondensation product of dimethyldiethoxysilane and phenyltriethoxysilane became a transparent amorphous film made from methyl-group containing silicon oxide by curing.

Comparative Example 3

4.17 g of tetraethoxysilane, 19.23 g of phenyltriethoxysilane and 5.8 g of ethanol were weighed and stirred in the atmosphere at room temperature to prepare a homogeneous solution. The molar ratio of phenyltriethoxysilane to tetraethoxysilane was 80/20. 15.8 g of 0.1 wt % formic acid was added slowly to the above solution and stirred in the atmosphere at room temperature for another 2 hours to carry out cohydrolysis between tetraethoxysilane and phenyltriethoxysilane. This solution was further heated in an oven at 80° C. for 12 hours and the obtained solution containing a cohydrolysis/polycondensation product of tetraethoxysilane and phenyltriethoxysilane was used as a coating solution.

This coating solution was applied to the same quartz glass mold having a release film as used in Comparative Example 2 to form a coating film under the same conditions as in Example 1 which was then cured and pressed. This inorganic-organic composite thick film made from the cohydrolysis/polycondensation product of ditetraethoxysilane and phenyltriethoxysilane became a transparent amorphous film made from phenyl-group containing silicon oxide by curing.

A fine lens pattern was formed on the surface of each of the films obtained in the above Comparative Examples 1 to 3. The lens focusing distance, transparency at a visible range, refractive index, spherical aberration (incident angle of 0° and 5°), coma aberration and microhardness of the film and the formation of a depression when the nail of a finger was strongly pressed against the film were measured in the same manner of Example 1 and the results are shown in Table 1 and Table 2.

Example 2

The above coating solution 2 was applied to a quartz glass mold having a release film and a thickness of 1 mm and a large number of semispherical depressions having a depth of 3.8 μm and a curvature radius of 121 μm and disposed in a matrix form at a pitch of 80 μm in the surface to form a coating film under the same conditions as in Example 1 which was then cured and pressed. This inorganic-organic composite thick film made from the cohydrolysis/polycondensation product of phenyltriethoxysilane and zirconium butoxide became a transparent amorphous thick film made from phenyl group-containing silicon oxide-zirconium oxide by curing.

Example 3

The above coating solution 3 was applied to a quartz glass mold having a release film and a thickness of 1 mm and a large number of semispherical depressions having a depth of 3.6 μm and a curvature radius of 126 μm and disposed in a matrix form at a pitch of 80 μm in the surface to form a coating film under the same conditions as in Example 1 which was then cured and pressed. This inorganic-organic composite thick film made from the cohydrolysis/polycondensation product of phenyltriethoxysilane and aluminum butoxide became a transparent amorphous thick film by curing.

Example 4

The above coating solution 3 was applied to the same quartz glass mold having a release film and a thickness of 1 mm as in Example 2 to form a coating film under the same conditions as in Example 1 which was then cured and pressed. This inorganic-organic composite thick film made from the cohydrolysis/polycondensation product of benzyltrichlorogermane and germanium tetrachloride became a transparent amorphous thick film made from benzyl group-containing germanium oxide by curing.

Example 5

The above coating solution 4 was applied to the same quartz glass mold having a release film and a thickness of 1 mm as in Example 2 to form a film under the same conditions as in Example 1 which was then cured and pressed. This inorganic-organic composite thick film made from the cohydrolysis/polycondensation product of phenyltrichlorotin and tetraethoxysilane became a transparent amorphous thick film made from phenyl group-containing silicon oxide-tin oxide by curing.

A fine lens pattern was formed on the surface of each of the films obtained in Examples 2 to 5. The lens focusing distance, transparency at a visible range, refractive index, spherical aberration (incident angle of 0° and 5°), coma aberration and microhardness of the film, the formation of a depression when the nail of a finger was strongly pressed against the film, the cracking and separation of the film after the heat resistance test and a change in lens focusing distance before and after the heat resistance test were measured in the same manner of Example 1 and the results are shown in Table 1 and Table 2.

TABLE 1

|  | Lens focusing distance (mm) | transparency at visible range | refractive index | spherical aberration Incident angle 0° | 5° | coma aberration |
|---|---|---|---|---|---|---|
| Ex. 1 | 2.01 | Completely transparent | 1.64 | 0.045 | 0.050 | small |
| C. Ex. 1 | 2.05 | Completely transparent | 1.45 | 0.045 | 0.120 | Large |
| C. Ex. 2 | 2.05 | Completely transparent | 1.52 | 0.045 | 0.120 | Large |
| C. Ex. 3 | 2.05 | Completely transparent | 1.50 | 0.047 | 0.120 | Large |
| Ex. 2 | 2.03 | Completely transparent | 1.56 | 0.045 | 0.060 | A little large |
| Ex. 3 | 2.02 | Completely transparent | 1.62 | 0.045 | 0.047 | small |
| Ex. 4 | 2.03 | Completely transparent | 1.56 | 0.045 | 0.060 | A little large |
| Ex. 5 | 2.03 | Completely transparent | 1.56 | 0.045 | 0.060 | A little large |

Ex.: Example C. Ex.: Comparative Example

TABLE 2

|  |  | depression | heat resistance | |
|---|---|---|---|---|
|  | Micro-hardness | formed by pressing nail | Cracking and separation | change in focusing distance |
| Ex. 1 | 23 | none | none | Not depressed |
| C. Ex. 1 | 3 | Slightly depressed | none | Not depressed |
| C. Ex. 2 | 3 | Slightly depressed | none | Not depressed |
| C. Ex. 3 | 3 | Slightly depressed | none | Not depressed |
| Ex. 2 | 22 | none | none | Not depressed |
| Ex. 3 | 20 | none | none | Not depressed |
| Ex. 4 | 22 | none | none | Not depressed |
| Ex. 5 | 22 | none | none | Not depressed |

Ex.: Example C. Ex.: Comparative Example

The gelled film formed on the surface of the substrate produced by the present invention has a high refractive index, excellent heat resistance, high hardness and excellent transferability which could not be attained in the prior art. For example, when the film is used in the production of a planar microlens array, the refractive index of the film can be increased to 1.50 to 1.70. Therefore, there can be provided an optical element such as a planar microlens array having lenses with small coma aberration easily.

What is claimed is:

1. An article having surface irregularities comprising a substrate and an organic-inorganic composite film formed on the surface of the substrate, wherein the organic-inorganic composite film contains a metal oxide represented by the following formula (3):

$$M^3O_p \quad (3)$$

wherein $M^3$ is Si, Ti, Zr, Ge, Al, Sn or Sb, and p is 2 when $M^3$ is Si, Ti, Zr, Ge or Sn and 3/2 when $M^3$ is Al or Sb, and a metal compound represented by the following formula (4):

$$R^2M^4O_q \quad (4)$$

wherein $R^2$ is an aryl group, substituted aryl group or benzyl group, $M^4$ is Si, Ti, Zr, Ge, Al, Sn or Sb, and q is 3/2 when $M^4$ is Si, Ti, Zr, Ge or Sn and 2 when $M^4$ is Al or Sb; and wherein at least one of $M^3$ in the formula (3) and $M^4$ in the formula (4) is at least one specific metal atom selected from the group consisting of Ti, Zr, Ge, Al, Sn and Sb, and the specific metal atom accounts for at least 10 atom % of the total of $M^3$ and $M^4$.

2. The article of claim 1, wherein $R^2$ in the above formula (4) is a phenyl group or benzyl group.

3. The article of claim 1, wherein the organic-inorganic composite film is formed to a thickness of 0.5 to 10 µm and contains 5 to 50 mol % of a metal oxide represented by the above formula (3) and 50 to 95 mol % of a metal compound represented by the above formula (4) in which $M^4$ is Si.

* * * * *